May 18, 1948. R. W. TURK 2,441,733
CLEAT CHAIN
Filed April 16, 1945
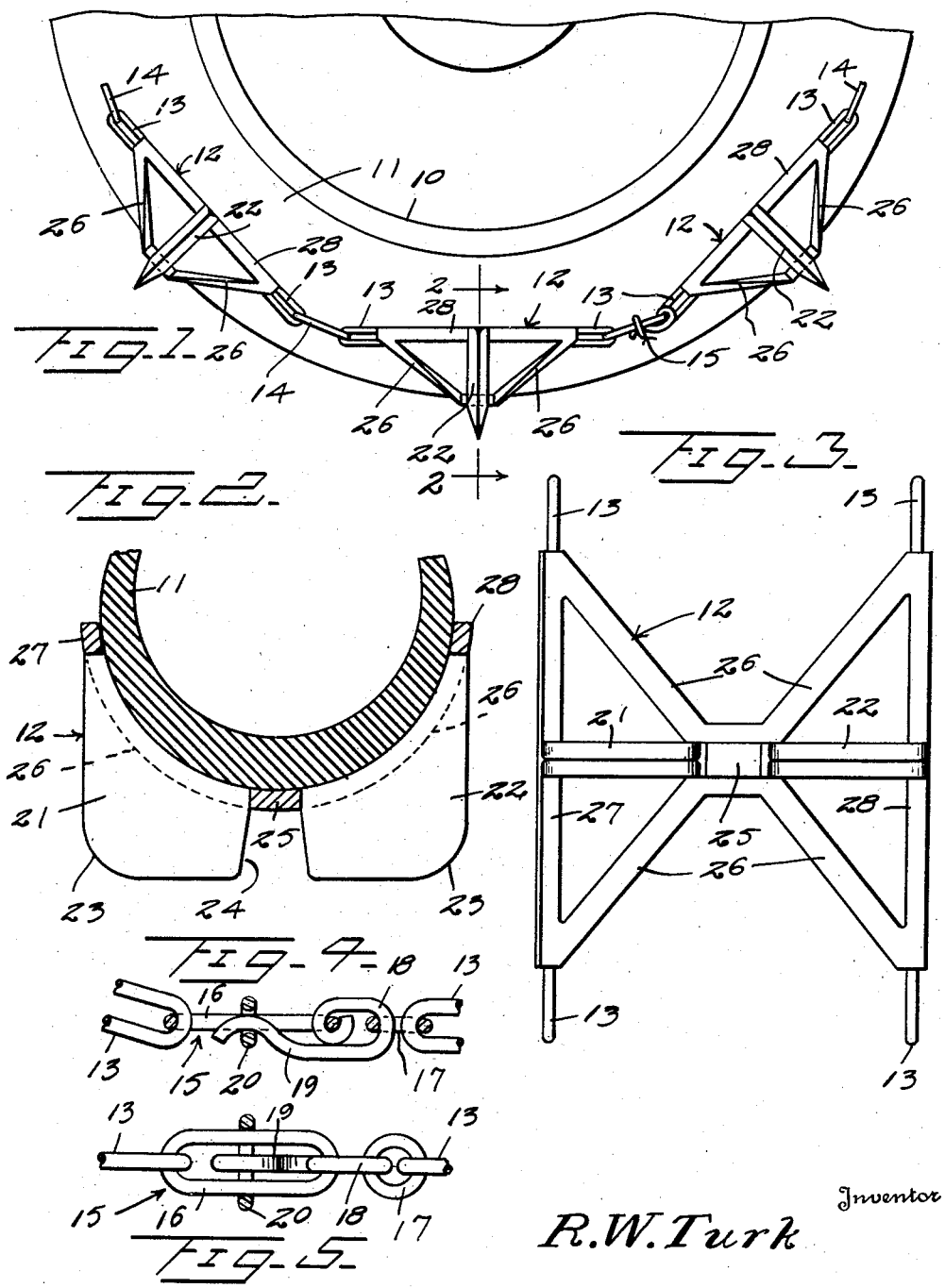
Inventor
R. W. Turk
By Randolph & Beavers
Attorneys Patented May 18, 1948

2,441,733

UNITED STATES PATENT OFFICE 2,441,733

CLEAT CHAIN

Richard W. Turk, Finlayson, Minn.

Application April 16, 1945, Serial No. 588,579

4 Claims. (Cl. 152—228)

This invention relates generally to anti-skid devices for vehicle wheels and more particularly to a cleat chain for tractors having rubber tires, the principal object being to provide a new and improved anti-skid arrangement for tractors, whereby the same may be operated effectively on wet slippery ground or in loose soil or snow.

Another object is to provide a cleat chain which comprises a plurality of cross cleats adapted to dig into the ground or tractive surface thereby to increase the traction of the tractor therewith.

Still another object is to provide a supporting frame work for the cross cleats adapted to maintain the cleats in a surface penetrating position on the tire as the tractor wheel turns.

An additional object is to provide a cleat supporting frame work which readily may be assembled into a cleat chain together with like structures whereby the cleats thereof may be maintained in spaced relation about the periphery of the tire.

Still other objects and advantages are those inherent in the novel construction, combination and arrangement of parts as will become more clearly apparent as the description proceeds, reference being had to the accompanying drawings wherein:

Fig. 1 is a fragmentary view in elevation of a tractor wheel employing the cleat chain of the present invention in accordance with a preferred embodiment thereof, Fig. 2 is a somewhat enlarged sectional view of the tire and cross cleat as seen substantially along the line 2—2 of Figure 1, Fig. 3 is an enlarged plan view of a cross cleat and the supporting frame work therefor, Fig. 4 is a detailed view partly in section of the locking arrangement for the cleat chain, Fig. 5 is a view partly in section of the locking arrangement as seen when turned through 90° from the position shown in Fig. 4.

Referring now to the drawings for a more detailed description of the invention, 10 designates a tractor wheel having a conventional rubber pneumatic tire 11 above the periphery of which the cleat chain of the present invention is attached.

The cleat chain comprises a plurality of ground engaging units 12 each having a pair of chain link portions 13 on each side of the tire casing whereby adjacent units may be linked together as by suitable intermediate links 14. The several units of the cleat chain preferably are fully assembled before attachment to the tire except for the adjacent units adapted to close the loop thereabout, suitable locking means, for this purpose, being designated 15 and shown in detail in Figures 4 and 5.

Referring to Figures 4 and 5, it will be seen that locking means 15 comprises a pair of links 16 and 17 which are carried by the link portions 13 of the adjacent chain closing units respectively. A locking link, formed so as to be pivotally carried on the free end of link 16, comprises a loop or hook portion 18 adapted to be linked with link 17 and a latch portion 19 adapted to be releasably retained within a loop or sliding ring 20 carried transversely of link 16. Thus, the loop of the cleat chain may be broken merely by sliding ring 20 along link 16 until latch 19 is fully withdrawn from the ring after which the locking loop or hook portion 18 may be pivoted on link 16 sufficiently to slide link 17 off latch portion 19, it being understood that one such locking arrangement is employed on each side of the tire.

Each unit 12 comprises a cross cleat which extends transversely of the tire and consists of two radially extending ground piercing plates or ribs 21 and 22 each of which is formed to a sharpened edge at the outer or ground engaging extremity thereof and formed arcuately on the inner edge thereof to conform to the curvature of the tire. The sides of cleats 21 and 22 preferably are rounded as at 23 and are formed to provide a suitable space 24 therebetween to facilitate penetration of the tractive surface.

Cleats 21 and 22 preferably are integrally joined as at 25, and arcuate supporting members 26 extend diagonally from the joining members 25 and on either side of cleats 21 and 22 to join the extremities of longitudinally extending support members 27 and 28, also preferably formed integrally with cleats 21 and 22 respectively.

Members 26, 27 and 28 comprise a frame work for maintaining cleats 21 and 22 in a radially extending position with respect to the tire whereby the cleats are adapted to retain their ground piercing positions as the tire rotates along the ground. For this purpose, the cleats and frame work members preferably are formed integrally of any material suitable for the purpose such, for example, as rubber or steel.

From the foregoing it should now be apparent that a cleat chain has been provided which is well adapted to fulfill the aforestated objects of the invention and while a single embodiment thereof has been disclosed it will be further apparent that additional embodiments may be provided without departing from the spirit and scope of the invention as defined by the appended claims.

I claim as my invention:

1. In a cleat chain for a wheel having a pneumatic tire, the combination of a plurality of plate-like cleats disposed transversely and radially of the tire and in spaced relation thereabout, means for maintaining the cleats in spaced relation about the periphery of the tire, and means individual to each of the cleats for maintaining the same in said transverse and radial relation with respect to the tire as the wheel moves along the ground, said cleats extending radially outwardly with respect to the tread of the tire to substantially beyond said last mentioned means whereby the cleats will form the sole surface engaging elements of the cleat chain.

2. In a cleat chain for a wheel having a pneumatic tire, the combination of a plurality of cleats disposed transversely of the tire and in spaced relation about the periphery thereof, each of said cleats comprising a pair of integrally formed plate-like ribs extended radially and transversely of the tire and disposed in spaced end-to-end relationship to form individual ground piercing members as the wheel moves along the ground, and means individual to each of said cleats for maintaining the plate-like webs thereof in said radially extended position as the wheel moves along the ground, said means comprising non-surface engaging members connected to the ribs and adapted to bear against portions of the tire.

3. In a traction unit for wheels having pneumatic tires, a frame formed of side members adapted to be disposed against and longitudinally of the side walls of a tire, an arcuate cross member adapted to be disposed transversely to and across the surface engaging parts of the tire and connected at its ends to the intermediate portions of the longitudinal members, arcuate diagonal members extending from the intermediate portion of the cross member to the ends of the longitudinal members, and a surface engaging web disposed longitudinally of the cross member and projecting therefrom in a direction radially of the tire.

4. A traction unit as in claim 3, said web having a gap intermediate of its ends.

RICHARD W. TURK.

REFERENCES CITED

The following references are of record in the file of this patent:

UNITED STATES PATENTS

| Number | Name | Date |
|---|---|---|
| 1,257,379 | Mueller | Feb. 26, 1918 |
| 1,479,372 | Cook | Jan. 1, 1924 |
| 1,525,779 | King | Feb. 10, 1925 |
| 1,585,968 | Engberg | May 25, 1926 |

FOREIGN PATENTS

| Number | Country | Date |
|---|---|---|
| 116,993 | Australia | 1943 |